United States Patent
Galindo et al.

(10) Patent No.: US 10,259,983 B2
(45) Date of Patent: *Apr. 16, 2019

(54) FLUORINATED PACKER FLUIDS

(71) Applicant: Halliburton Energy Services, Inc., Houston, TX (US)

(72) Inventors: Kay Ann Galindo, Montgomery, TX (US); Jay Paul Deville, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/525,517

(22) PCT Filed: Dec. 23, 2014

(86) PCT No.: PCT/US2014/072204
§ 371 (c)(1),
(2) Date: May 9, 2017

(87) PCT Pub. No.: WO2016/105394
PCT Pub. Date: Jun. 30, 2016

(65) Prior Publication Data
US 2017/0327724 A1    Nov. 16, 2017

(51) Int. Cl.
| | |
|---|---|
| *C09K 8/28* | (2006.01) |
| *C09K 8/36* | (2006.01) |
| *C08L 71/02* | (2006.01) |
| *C09K 8/58* | (2006.01) |
| *E21B 21/00* | (2006.01) |
| *E21B 37/00* | (2006.01) |
| *E21B 41/02* | (2006.01) |
| *E21B 33/12* | (2006.01) |

(52) U.S. Cl.
CPC .............. *C09K 8/28* (2013.01); *C08L 71/02* (2013.01); *C09K 8/36* (2013.01); *C09K 8/58* (2013.01); *E21B 21/003* (2013.01); *E21B 37/00* (2013.01); *E21B 41/02* (2013.01); *C08L 2201/52* (2013.01); *C09K 2208/32* (2013.01); *E21B 33/12* (2013.01)

(58) Field of Classification Search
CPC . C09K 8/035; C09K 8/80; C09K 8/62; C09K 8/64; C09K 8/52; C09K 8/68; C09K 8/42; C09K 8/82; C09K 8/72; C09K 8/44; C09K 8/74; C09K 8/12; C09K 8/03; C09K 8/36; C09K 8/50; C09K 8/70; C09K 8/40; C09K 8/516; C09K 8/60; C09K 8/426; C09K 8/56; C09K 8/605; C09K 8/76; C09K 8/88; C09K 8/34; C09K 8/032; C09K 8/508; C09K 8/46; C09K 8/58; C09K 8/08; C09K 8/24; C09K 8/28; C09K 8/32; C09K 8/38; C09K 8/54; C09K 8/94; E21B 33/14; E21B 43/16; E21B 17/042; E21B 43/26; E21B 43/267
See application file for complete search history.

(56) References Cited

U.S. PATENT DOCUMENTS

| | | | |
|---|---|---|---|
| 4,990,283 A | 2/1991 | Visca et al. | |
| H1611 H * | 11/1996 | Patel | 507/103 |
| 6,173,783 B1 * | 1/2001 | Abbott-Brown | E21B 34/063 166/308.1 |
| 6,235,701 B1 | 5/2001 | Senger Elsernd | |
| 7,858,564 B2 | 12/2010 | Pasquier et al. | |
| 9,663,700 B2 * | 5/2017 | Morris | C09K 8/03 |
| 9,803,452 B2 * | 10/2017 | Morris | E21B 43/00 |
| 2009/0192051 A1 | 7/2009 | Carman | |
| 2010/0307831 A1 | 12/2010 | Pasquier et al. | |
| 2011/0319302 A1 * | 12/2011 | Li | C09K 8/685 507/217 |
| 2013/0220608 A1 * | 8/2013 | Rincon-Torres | C09K 8/70 166/285 |
| 2014/0060841 A1 * | 3/2014 | Morris | C09K 8/34 166/305.1 |

OTHER PUBLICATIONS

Kay A. Galindo et al, Fluorous-Based Drilling Fluid for Ultra-High-Temperature Wells, SPE 166126, Sep. 30-Oct. 2, 2013.*
Oilfield glossary definition of Packer Fluid dated Feb. 5, 2013.
International Search Report and Written Opinion for Application No. PCT/US2014/072204 dated Aug. 27, 2015.

* cited by examiner

*Primary Examiner* — Kumar R Bhushan
(74) *Attorney, Agent, or Firm* — Tenley Krueger; C. Tumey Law Group PLLC

(57) ABSTRACT

Methods and systems of treating a well are provided. A method comprises providing a packer fluid comprising a fluorous oil; and introducing the packer fluid into a wellbore. The method further comprises introducing the packer fluid into the wellbore may further comprise introducing the packer fluid into a volume above a packer and inside a casing.

10 Claims, 2 Drawing Sheets

FLUORINATED PACKER FLUIDS

BACKGROUND

Methods of using packer fluids and, more particularly, methods of using solids free packer fluids comprising a fluorous oil in well operations are provided.

Packer fluids may be used during drilling and/or completion of a wellbore and may serve a variety of functions. In drilling operations, a packer fluid may be introduced and allowed to remain in the annulus between the casing and the tubing and may be disposed above a packer. The packer fluid may be used to provide hydrostatic pressure in order to lower the differential pressure across a sealing element in the wellbore, may lower the differential pressure in the wellbore and casing to prevent collapse, and may protect metals and elastomers from corrosion.

Packer fluids may also be used in well completion, either prior to or subsequent to the start of production. The packer fluids may be placed in the annulus between the tubing and the casing and may be disposed above a packer. Typically, the packer fluids may be of a sufficient density to control a producing formation, be resistant to viscosity changes over an extended period of time, and be noncorrosive to wellbore components and equipment.

Typical packer fluids may comprise brines. Problems with brines may include high thermal conductivity and the potential for corrosion of well components. Packer fluids comprising a high thermal conductivity may allow for heat transfer to and from elements within the wellbore. This may result in problems during production, in particular for formations that comprise bituminous materials, as the cooling of said materials may allow them to harden and damage well equipment. Further, brines can corrode well components and equipment over time resulting in increased operating expenses as well as increased downtime should the corrosion severely damage the equipment and require replacement.

BRIEF DESCRIPTION OF THE DRAWINGS

These drawings illustrate certain aspects of some of the examples of the present method and should not be used to limit or define the method.

DETAILED DESCRIPTION

Figure 1:
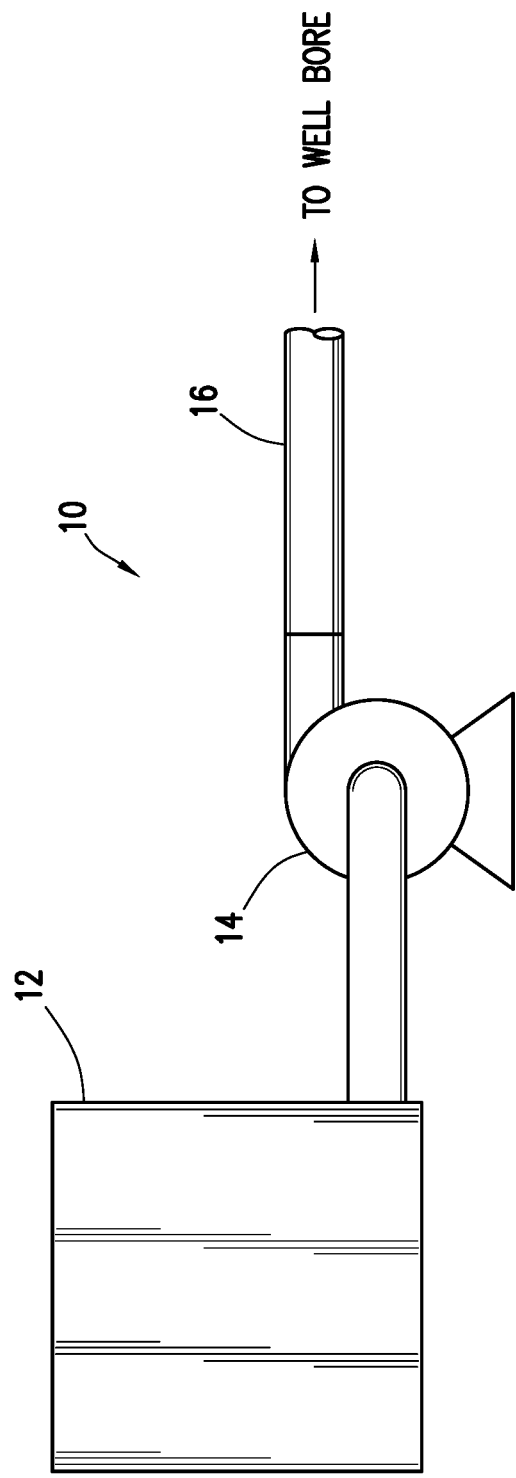
FIG. 1 illustrates surface equipment that may be used in the placement of a packer fluid in a wellbore in accordance with certain examples.

Methods of using packer fluids and, more particularly, methods of using solids free packer fluids comprising a fluorous oil in well operations are provided.

The packer fluids may comprise a fluorous oil. Alternatively, the packer fluids may comprise an invert emulsion comprising a fluorous oil external phase, an aqueous or nonaqueous internal phase, and optionally, a fluorous surfactant and/or a weighting agent(s). Except for the optional addition of weighting agents, the packer fluids described herein may be solids free packer fluids. Advantageously, the packer fluids may be used in applications that comprise a broad range of densities. Further advantageously, the packer fluids may be capable of withstanding relatively high temperatures (e.g., temperatures greater than 650° F.). Further, the packer fluids may, in some examples, be salt-free and thus do not possess the risk of well component corrosion that may be present in formulations using brines or other salt containing fluids. Finally, the packer fluids possess low thermal conductivity; therefore, the packer fluids resist the transfer of heat, both to and from other materials. Thus, while the packer fluids may be suitable for a variety of well conditions and subterranean formation types, they may be particularly suitable for use in wells requiring high fluid densities, high temperature resistance, operations where corrosion may be an issue, or operations in which heat transfer between materials is to be avoided (e.g., operations where bituminous materials may be present).

The packer fluids may comprise a fluorous oil. Any fluorous organic liquid may be suitable for use as the fluorous oil. The fluorous oil comprises carbon and at least one fluorine functional group. The fluorous oil may be polyfluorinated or perfluorinated. The fluorous oil may comprise functional groups other than fluorinated or hydrocarbon-containing groups. Without limitation, examples of the fluorous oil may include perfluoropolyethers ("PFPE"), perfluoroamines ("PFA"), perfluorohydrocarbons, polyfluorinated ethers, polyfluorinated amines, polyfluorinated hydrocarbons, and their derivatives. Examples of commercially available fluorous oils include KRYTOX™, available from Dupont of Wilmington, Del.; FOMBLIN®, available from Solvay Plastics in Alpharetta, Ga.; and DEMNUM®, available from Daikin Company in Orangeburg, N.Y.

The packer fluid may be essentially solids free. As defined herein, solids free means a packer fluid comprising only fluids, which may, in some examples, comprise salt(s) at a concentration below the solubility limit of the salt(s) under wellbore conditions. In some examples, weighting additives, which may comprise solids, may be used to increase the density of the packer fluids. It is to be understood that weighting additives are optional and their use is not critical for the functionality of the packer fluid formulations described herein.

The fluorous oil may comprise 100% of the packer fluid with no additives or, in other words, the packer fluid may consist of the fluorous oil. In other examples, the fluorous oil may be used with additives such as density modifying additives (e.g., weighting agents). In alternative examples, an invert emulsion comprising the fluorous oil may be used. The fluorous oil may be present in the invert emulsion in an external phase to internal phase ratio of about 50:50 to about 99:1. For example, the fluorous oil may be present in the invert emulsion in an external phase to internal phase ratio of about 60:40, about 70:30, about 80:20, about 90:10, etc. With the benefit of this disclosure one of ordinary skill in the art should recognize the appropriate amount of fluorous oil for a chosen application.

Optionally, the packer fluid may comprise an invert emulsion. In examples utilizing an invert emulsion, the external phase may comprise the fluorous oil. The internal phase may comprise an aqueous or nonaqueous fluid. In examples comprising an aqueous fluid internal phase, the aqueous fluid may be any such aqueous fluid suitable for use. The aqueous fluid may be from any source provided that it does not contain an excess of compounds that may undesirably affect other components in the packer fluids, for example. The aqueous fluid may comprise fresh water or salt water. Salt water generally may include one or more dissolved salts therein and may be saturated or unsaturated as desired for a particular application. Seawater or brines may be suitable for use in some applications.

In some examples, the internal phase may be a salt-free non-chloride containing internal phase. An example of a salt-free non-chloride containing internal phase may be a salt-free non-chloride containing aqueous fluid or nonaqueous fluid. The salt-free non-chloride containing internal phase may comprise a mixture. For example, the salt-free non-chloride containing internal phase may comprise a mixture of a polyol in water. The polyol may make up any percentage of the mixture in the range of about 20% to about 99% by weight of the mixture, for example the polyol may comprise about 20%, about 40%, about 60%, about 80%, or about 99% by weight of the mixture. An example of a salt-free non-chloride containing aqueous fluid comprising a polyol may be a mixture of glycerol in water. In some examples, the internal phase may comprise a nonaqueous fluid. For example, the internal phase may comprise a 100% polyol fluid. As noted above, in some examples, the nonaqueous fluid may be a salt-free non-chloride containing nonaqueous fluid. An example of a salt-free non-chloride containing nonaqueous fluid may be a 100% glycerol fluid. Further examples of suitable polyols may include, but are not limited to glycerine, ethylene glycol, propylene glycol, polyethylene glycol, polypropylene glycol, diethylene glycol, and sugar alcohols. Additionally sugars such as glucose, fructose, mannitol, sucrose, and xylose may be substituted for the polyols; as many carboxylic acids such as citric acid, tartaric acid, and malic acid; amino acids such as glycine and alanine; nitrogen compounds such as urea; and more generally any organic capable of reducing the water activity of the aqueous phase.

The internal phase may be present in the invert emulsion examples in an external phase to internal phase ratio of about 50:50 to about 99:1. With the benefit of this disclosure one of ordinary skill in the art should recognize the appropriate type and ratio for the internal phase of the invert emulsions examples for a chosen application.

The packer fluids may comprise a fluorosurfactant. Fluorosurfactants are synthetic organofluorine chemical compounds that may comprise multiple fluorine atoms. They may be polyfluorinated or perfluorinated. Without limitation, some fluorosurfactants may be used to lower the surface tension of the internal phase in examples utilizing an invert emulsion. The fluorosurfactants may have a fluorinated tail and a hydrophilic head. Without limitation, examples of fluorosurfactants may include perfluorooctanesulfonic acid, perfluorooctanoic acid, perfluorononanoic acid, perfluorobutanesulfonic acid, tetrafluoropropanol, octafluoropentanol, dodecafluoroheptanol, fluorinated telomer alcohols, fluorophosphates, salts of fluorophosphates, fluorosulfonates, salts of fluorosulfonates, and combinations thereof. The fluorosurfactant may be present in the packer fluids in an amount in the range of from about 0.01% to about 10% by weight of the packer fluid. More particularly, the fluorosurfactant may be present in an amount ranging between any of and/or including any of about 0.01%, about 0.1%, about 1%, about 2%, about 4%, about 6%, about 8%, or about 10% by weight of the packer fluid. A commercial example of a fluorosurfactant is FLUOROLINK® F10 available from Solvay Plastics in Alpharetta, Ga. One of ordinary skill in the art, with the benefit of this disclosure, should recognize the appropriate type and amount of fluorosurfactant to include for a chosen application.

The packer fluids may optionally comprise a fluid loss additive. Fluid loss additives, e.g., polymers, may be included in the packer fluids. Amongst other reasons, fluid loss additives may be included in the packer fluids to control fluid loss to the formation. Without limitation, examples of fluid loss additives may include perfluoropolystyrene, perfluoropolytert-butylstyrene, perfluoropolymethylstyrene acrylates, polytetrafluoroethylene, perfluoropolyalkylethyl acrylates, perfluoropolyalkylethyl methacrylates, perfluoropolyalkyl acrylates, perfluorinated polyamides, perfluoropolyacrylamides, polytetrafluoroethylene-polyamides, fluorinated polyamides, perfluorinated tall oil fatty amides, perfluoropolystyrenebutadienes, perfluoropolyethylene ethene/butene copolymer, and the like. The fluid loss additives may be included in the packer fluids in any amount sufficient to control loss of the packer fluids (or subsequently pumped fluids) to the formation. For example, the fluid loss additives may be present in the packer fluids in an amount in the range of from about 0% to about 10% by weight of the packer fluid. More particularly, the fluid loss additives may be present in an amount ranging between any of and/or including any of about 0%, about 0.1%, about 1%, about 2%, about 4%, about 6%, about 8%, or about 10% by weight of the packer fluid. One of ordinary skill in the art, with the benefit of this disclosure, should recognize the appropriate type and amount of fluid loss additive to include for a chosen application.

The packer fluids may optionally comprise a corrosion inhibitor. The fluorous oil generally provides sufficient corrosion resistance without the use of corrosion inhibitors, however is some formations additional corrosion inhibition may be desired. Corrosion inhibitors may be used to shield well components and equipment from corrosion. Without limitation, examples of corrosion inhibitors include perfluoropolystyrene, perfluoropolytert-butylstyrene, perfluoropolymethylstyrene acrylates, polytetrafluoroethylene, and the like. Both fluorous-based and nonfluorous-based corrosion inhibitors may be used. The corrosion inhibitors may be included in the packer fluids in any amount sufficient to prevent corrosion of well components and equipment. For example, the corrosion inhibitors may be present in the packer fluids in an amount in the range of from about 0% to about 10% by weight of the packer fluid. More particularly, the corrosion inhibitors may be present in an amount ranging between any of and/or including any of about 0%, about 0.1%, about 1%, about 2%, about 4%, about 6%, about 8%, or about 10% by weight of the packer fluid. One of ordinary skill in the art, with the benefit of this disclosure, should recognize the appropriate type and amount of corrosion inhibitor to include for a chosen application.

The packer fluids may optionally comprise a viscosifier. The viscosifier may be included to optimize fluid rheology and to stabilize the suspension. Without limitation, examples of viscosifiers include perfluorinated polyamides, perfluoropolyacrylamides, polytetrafluoroethylene-polyamides, fluorinated polyamides, perfluorinated tall oil fatty amides, fluorinated polysaccharides, perfluorinated fatty acids, perfluorinated tall oil fatty acids, perfluoropolystyrenebutadienes, perfluoropolyethylene ethene/butene copolymer, and the like. Viscosifiers may be included in the packer fluids in any amount sufficient to viscosify the packer fluids to the desired degree. For example, the viscosifiers may be present in the packer fluids in an amount in the range of from about 0% to about 10% by weight of the packer fluid. More particularly, the viscosifiers may be present in an amount ranging between any of and/or including any of about 0%, about 0.1%, about 1%, about 2%, about 4%, about 6%, about 8%, or about 10% by weight of the packer fluid. One of ordinary skill in the art, with the benefit of this disclosure, should recognize the appropriate type and amount of viscosifier to include for a chosen application.

Weighting agents are typically materials that weigh more than water and may be used to increase the density of the packer fluids. By way of example, weighting agents may have a specific gravity of about 2 or higher (e.g., about 2, about 4, etc.). Examples of weighting agents that may be used include, but are not limited to, hematite, hausmannite, barite, and combinations thereof. Specific examples of suitable weighting agents include API grade barite. Commercial examples of weighting agents include HI-DENSE® weighting agent, BAROID® 41 weighting agent, and BARACARB® weighting agents; all of which are available from Halliburton Energy Services Inc., Houston, Tex. The weighting agents may be present in the packer fluids in an amount in the range of from about 0% to about 50% by weight of the packer fluid. More particularly, the weighting agents may be present in an amount ranging between any of and/or including any of about 0%, about 0.1%, about 1%, about 2%, about 4%, about 6%, about 8%, about 10%, about 20%, about 30%, about 40%, or about 50% by weight of the packer fluid. One of ordinary skill in the art, with the benefit of this disclosure, should recognize the appropriate type and amount of weighting agent to include for a chosen application.

Lost-circulation materials may be included in the packer fluids to, for example, help prevent the loss of fluid circulation into the subterranean formation. Examples of lost-circulation materials include but are not limited to, polytetrafluoroethylene fibers, fluorinated fibers, polytetrafluoroethylene-polyamides, fluorinated polyamides, perfluorinated resins, fluorinated telomers, and the like. Non-fluorous lost-circulation materials such as graphite, nut shells, calcium carbonate, and the like, may also be used if desired. Further examples of lost-circulation materials may include various types of fibers including non-fluorous natural or synthetic fibers. For example, the lost-circulation fiber types may include natural, biopolymers, synthetic, biodegradable, and/or biocompatible fibers. Examples of synthetic fibers may include, but are not limited to, polymers composed of polypropylene, polyaramide, polyester, polyacrylonitrile, and polyvinyl alcohol. Examples of biodegradable fibers may include, but are not limited to, fibers composed of modified cellulose, chitosan, soya, modified chitosan, polycaprolactone, poly(3-hydroxybutyrate), polyhydroxy-alkanoates, polyglycolic acid "PGA", polylactic acid "PLA", polyorthoesters, polycarbonates, polyaspartic acid, polyphosphoesters, soya, or copolymers thereof. Examples of other suitable fibers may include, but are not limited to fibers of cellulose including viscose cellulosic fibers, oil coated cellulosic fibers, and fibers derived from a plant product like paper fibers; carbon including carbon fibers; melt-processed inorganic fibers including basalt fibers, wollastonite fibers, non-amorphous metallic fibers, ceramic fibers, and glass fibers. The lost-circulation materials may be present in the packer fluids in an amount in the range of from about 0% to about 20% by weight of the packer fluid. More particularly, the lost-circulation materials may be present in an amount ranging between any of and/or including any of about 0%, about 0.1%, about 1%, about 2%, about 4%, about 6%, about 8%, about 10%, or about 20% by weight of the packer fluid. One of ordinary skill in the art, with the benefit of this disclosure, should recognize the appropriate type and amount of lost circulation material to include for a chosen application.

Those of ordinary skill in the art should appreciate that examples of the packer fluids generally should have a density suitable for a particular application. By way of example, the packer fluids may have a density in the range of from about 10 pounds per gallon ("lb/gal") to about 24 lb/gal. In certain examples, the packer fluids may have a density in the range of from about 14 lb/gal to about 22 lb/gal. In specific examples, the packer fluids may have a density between any of and/or including any of about 10 lb/gal, about 11 lb/gal, about 12 lb/gal, about 13 lb/gal, about 14 lb/gal, about 15 lb/gal, about 16 lb/gal, about 17 lb/gal, about 18 lb/gal, about 19 lb/gal, about 20 lb/gal, about 21 lb/gal, about 22 lb/gal, about 23 lb/gal, or about 24 lb/gal. In some optional examples, weighting additives (e.g., weighting agents) may be used to increase the density of the packer fluids. Examples of suitable weighting additives may include barite, hematite, hausmannite, calcium carbonate, siderite, ilmenite, or combinations thereof. In particular embodiments, the weighting additives may have a specific gravity of 2 or greater. Those of ordinary skill in the art, with the benefit of this disclosure, should recognize the appropriate density required for a particular application.

Those of ordinary skill in the art should appreciate that examples of the packer fluids generally should have a thermal conductivity suitable for a particular application. By way of example, the packer fluids may have a thermal conductivity in the range of from about 0.001 BTU/H*ft*° F. to about 1.0 BTU/H*ft*° F. In certain examples, the packer fluids may have a thermal conductivity in the range of from about 0.01 BTU/H*ft*° F. to about 0.03 BTU/H*ft*° F. Those of ordinary skill in the art, with the benefit of this disclosure, should recognize the appropriate thermal conductivity required for a particular application.

In some embodiments, a fluorinated cleaning fluid may be used to clean equipment and/or surfaces that have contacted the packer fluids disclosed herein. Such fluorinated cleaning fluids may be polyfluorinated or perfluorinated and may be used neat. Generally the fluorinated cleaning fluids would comprise boiling points from about 55° C. to about 270° C., have no flash point, have a low molecular weight, and be non-flammable. A commercial example of a suitable fluorinated cleaning fluid is GALDEN® HT 110 which has a boiling point of 110° C., average molecular weight of 580 a.m. u., low vapor pressure of 17 torr at 25° C., dielectric constant of 1.9, and is available from Solvay Plastics in Alpharetta, Ga. The fluorinated cleaning fluids may be miscible with the fluorous oils used in the packer fluids described herein. Typically, after the equipment or tools have been used with the packer fluids described herein, the equipment and tools may be considered fluorous-wet and the surface may be coated with the fluorous oil used in the packer fluid. The fluorous oil may be readily removed by rinsing or immersing the equipment or tool in the fluorinated cleaning fluid, which will clean the surface of any fluorous materials and return the surface back to its original state. After the equipment or tool is no longer in the presence of the fluorinated cleaning fluid, any residual fluorinated cleaning will rapidly evaporate. The resulting surface is then clean, and additional routine cleaning methods can be carried out as needed.

A method of treating a well is provided. The method may comprise providing a packer fluid comprising a fluorous oil; and introducing the packer fluid into a wellbore. Introducing the packer fluid into the wellbore may further comprise introducing the packer fluid into a volume above a packer and inside a casing. The fluorous oil may comprise a perfluoropolyether. The packer fluid may consist of the fluorous oil. The packer fluid may be in the form of an invert emulsion, and wherein the fluorous oil is the external phase of the invert emulsion. The internal phase may comprise a salt-free, non-chloride containing aqueous fluid. The internal phase may comprise a polyol. The internal phase may comprise a mixture comprising water and the polyol, wherein the polyol is present in an amount of about 20% to about 99% by weight of the mixture. The internal phase may comprise a brine. The fluorous oil may further comprise a fluorous surfactant. The packer fluid may further comprise at least one additive selected from the group consisting of fluid loss additive, corrosion inhibitor, viscosifier, weighting agent, lost circulation material, and combinations thereof. The packer fluid may have a density of about 14 pounds per gallon to about 22 pounds per gallon. The packer fluid may have a thermal conductivity less than 1.0 BTU/h*ft*° F.

A system for treating a well is provided. The system may comprise a fluid handling system containing a packer fluid, wherein the packer fluid comprises a fluorous oil; and a fluid conduit coupled to the pumping system and in fluid communication with a wellbore. The system may further comprise a packer and a casing, wherein the packer and the casing define a volume in the wellbore capable of containing the packer fluid. The fluid handling system may comprise mixing equipment and a pump. The fluorous oil may comprise a perfluoropolyether. The packer fluid may consist of the fluorous oil. The packer fluid may be in the form of an invert emulsion, and wherein the fluorous oil is the external phase of the invert emulsion. The internal phase may comprise a salt-free, non-chloride containing aqueous fluid. The internal phase may comprise a polyol. The internal phase may comprise a mixture comprising water and the polyol, wherein the polyol is present in an amount of about 20% to about 99% by weight of the mixture. The internal phase may comprise a brine. The fluorous oil may further comprise a fluorous surfactant. The packer fluid may further comprise at least one additive selected from the group consisting of fluid loss additive, corrosion inhibitor, viscosifier, weighting agent, lost circulation material, and combinations thereof. The packer fluid may have a density of about 14 pounds per gallon to about 22 pounds per gallon. The packer fluid may have a thermal conductivity less than 1.0 BTU/h*ft*° F.

The example packer fluids disclosed herein may directly or indirectly affect one or more components or pieces of equipment associated with the preparation, delivery, recapture, recycling, reuse, and/or disposal of the disclosed packer fluids. Any of the packer fluids described herein may be contained within a vessel and/or any type of sufficient storage system. Without limitation, examples of such vessels, may include mud pits, barrels, mixers, drums, trucks, storage containers, etc. Some of the example vessels may comprise mixing equipment, for example, baffles. Any of the vessel examples may be coupled to any of the pumps, pumping systems, conduits, or fluid recovery systems disclosed herein. Any of the pumps, pumping systems, or conduits disclosed herein may be coupled to one another as well as any other upstream or downstream system or equipment, such as vessels, storage systems, fluid recovery systems, and the like. Further, fluid recovery systems comprising vessels and/or pumping systems may be used to recovery any of the packer fluids described herein. These recovered packer fluids may be reconditioned and recycled, may be stored (e.g., using a storage system or vessel), or may simply be reused.

Referring now to FIG. 1, a fluid handling system 10 is illustrated. A packer fluid comprising a fluorous oil may be provided. In alternative examples, a packer fluid comprising a fluorous oil external phase and an aqueous or nonaqueous internal phase may be provided. The packer fluid may be mixed in mixing equipment 12, such as a mixer, recirculating tub, or any type of vessel comprising mixing equipment, and then pumped via pump 14 or any type of pumping system to the well bore via fluid conduit 16. Fluid conduit 16 may be any conduit coupled to pump 14 and may also be in fluid communication with pump 16 and the wellbore. Thus, fluid conduit 16 may convey a fluid, e.g., any of the example packer fluids disclosed herein, from pump 14 to the wellbore, where the fluid may be deposited within any section or location of the wellbore.

The packer fluids used herein may comprise any of the formulations of the disclosed packer fluids discussed above. For example, the packer fluids may comprise a fluorous oil. The fluorous oil may be solids free or may optionally comprise solids, such as weighting additives. Alternatively, the packer fluids may comprise an invert emulsion comprising a fluorous oil external phase, and an aqueous or non-aqueous internal phase. The disclosed packer fluids may be used to maintain hydrostatic pressure, prevent wellbore collapse, prevent or mitigate heat transfer to or from thermally conductive materials, reduce corrosion, and/or generally control the formation.

Figure 2:
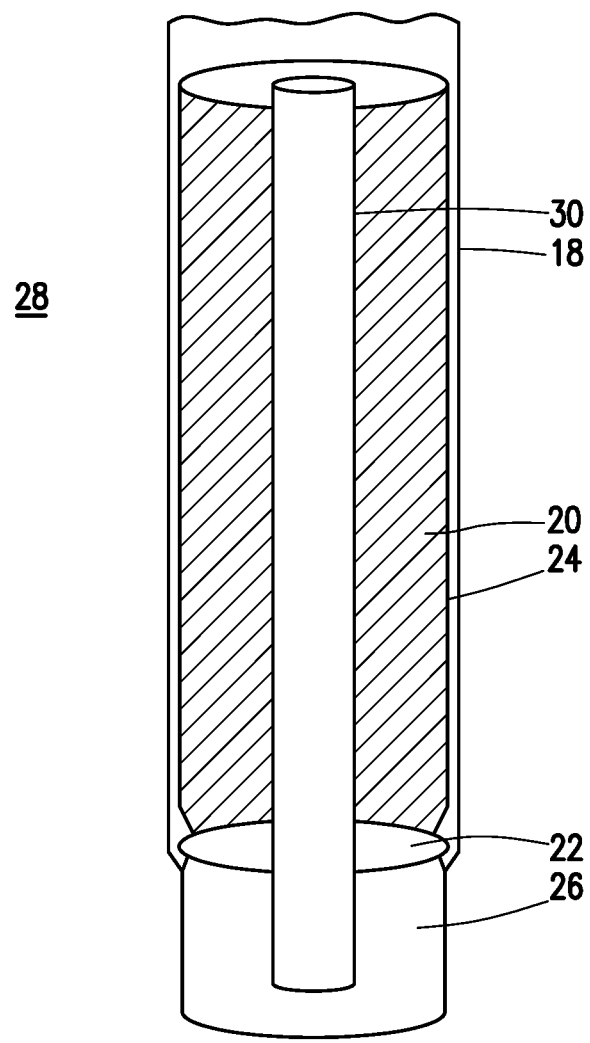
FIG. 2 illustrates the placement of a packer fluid in a wellbore in accordance with certain examples.

FIG. 2 illustrates a packer fluid that has been introduced, e.g., by a fluid conduit 16 into wellbore 18 and allowed to remain therein. The packer fluid 20 is pumped downhole so that it is disposed within a volume above the packer 22 and inside the casing 24. As illustrated, the packer fluid 20 may be disposed within the casing 22 above a production zone 26 in a subterranean formation 28. Production tubing 30 may be a conduit used for the transfer and production of hydrocarbons from producing zone 26 while packer fluid 20 assists in maintaining hydrostatic pressure. FIG. 2 illustrates the use of a packer fluid 20 just prior to production. However, packer fluid 20 may be used in a similar fashion during drilling of the wellbore if desired. At least a portion of packer fluid 20 may be left behind in the wellbore. In further optional examples, at least a portion of packer fluid 20 may be recovered. The recovered packer fluid may be recovered using a recovery system and optionally a storage system, said systems may comprise some of the equipment discussed above, for example vessels, pumps, conduits, etc.

The exemplary packer fluids disclosed herein may directly or indirectly affect one or more components or pieces of equipment associated with the preparation, delivery, recapture, recycling, reuse, and/or disposal of the disclosed packer fluids. For example, the disclosed packer fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary packer fluids. The disclosed packer fluids may also directly or indirectly affect any transport or delivery equipment used to convey the packer fluids to a well site or downhole such as, for example, any transport vessels, conduits, pipelines, trucks, tubulars, and/or pipes used to compositionally move the packer fluids from one location to another, any pumps, compressors, or motors (e.g., topside or downhole) used to drive the packer fluids into motion, any valves or related joints used to regulate the pressure or flow rate of the packer fluids, and any sensors (i.e., pressure and temperature), gauges, and/or combinations thereof, and the like. The disclosed packer fluids may also directly or indirectly affect the various downhole equipment and tools that may come into contact with the packer fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present claims, the following examples of certain aspects of the disclosure are given. In no way should the following examples be read to limit, or define, the entire scope of the claims.

Example 1

The following example is a comparative example provided to illustrate the ability of the disclosed packer fluids to resist heat transfer by comparing the thermal conductivity of the packer fluid formulations disclosed herein against other types of packer fluids. Two sample packer fluids were prepared comprising two different perfluoropolyether fluorous oils. The two fluorous oil samples were compared to fresh water, a brine, and an aqueous-based insulating packer fluid. The thermal conductivities of each fluid are illustrated in Table 1 below.

TABLE 1

Thermal Conductivities

| Material | Thermal Conductivity (BTU/h*ft*° F.) |
| --- | --- |
| Brine | 0.347 |
| Fresh Water | 0.288 |
| Aqueous Packer Fluid | 0.123-0.177 |
| Perfluoropolyether 1 | 0.028 |
| Perfluoropolyether 2 | 0.045 |

As illustrated, the two fluorous oil samples had markedly lower thermal conductivity values than the other fluids. Low thermal conductivity values may be of benefit in operations in which it is desirable to mitigate heat transfer between materials.

Example 2

Four packer fluid samples were prepared comprising an invert emulsion of a fluorous oil and water. The fluorous oil was FOMBLIN®, available from Solvay Plastics in Alpharetta, Ga. The water was a calcium chloride brine (24 wt. %). The samples further contained FLUOROLINK® F10 fluorosurfactant available from Solvay Plastics in Alpharetta, Ga. and enough barite to provide a fluid density of 18 lb/gal. The external phase to internal phase of each sample was varied according to the amount shown in Table 2 below to differentiate each sample.

The apparent viscosities of each sample were measured using a Model 35A Fann Viscometer and a No. 2 spring, in accordance with the procedure set forth in API RP Practice 13B-2, *Recommended Practice for Field Testing of Oil-Based Drilling Fluids*. The data is presented in Table 2 below.

TABLE 2

Packer Fluid Rheological Profile

| Ext./Int. | Fann 35 Readings | | | | | | 10 s/10 m gel, lb/100 ft$^2$ |
| --- | --- | --- | --- | --- | --- | --- | --- |
| | 3 | 6 | 100 | 200 | 300 | 600 | |
| 60/40 | 44 | 58 | OS | OS | OS | OS | 49/80 |
| 70/30 | 28 | 32 | 147 | 252 | OS | OS | 40/110 |
| 80/20 | 20 | 23 | 96 | 164 | 231 | OS | 30/65 |
| 90/10 | 4 | 5 | 33 | 63 | 93 | 180 | 9/10 |

OS = Off Scale

As shown by these measurements, the viscosity of all the samples remained high. The viscosity was the lowest with an external to internal ratio of 90/10 and overall viscosity increased as the proportion of the internal phase increased.

The preceding description provides various embodiments of the systems and methods of use disclosed herein which may contain different method steps and alternative combinations of components. It should be understood that, although individual embodiments may be discussed herein, the present disclosure covers all combinations of the disclosed embodiments, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method of treating a well comprising:
    providing a packer fluid comprising:
        a fluorous oil;
        an aqueous fluid, wherein the aqueous fluid comprises a polyol in water, wherein the polyol is present in an amount of about 20% to about 99% by weight of the aqueous fluid; and
        a fluorosurfactant selected from the group consisting of fluorophosphates, perfluorooctanesulfonic acid, perfluorooctanoic acid, and combinations thereof, wherein the packer fluid is in the form of an invert emulsion, wherein the fluorous oil is the external phase of the invert emulsion, and wherein the packer fluid is solids free; and
    introducing the packer fluid into a wellbore.

2. The method according to claim 1, wherein the introducing the packer fluid into the wellbore comprises introducing the packer fluid into a volume above a packer and inside a casing.

3. The method according to claim 1, wherein the fluorous oil comprises a perfluoropolyether.

4. The method according to claim 1, wherein the aqueous fluid comprises a salt-free, non-chloride containing aqueous fluid.

5. The method according to claim 1, wherein the packer fluid further comprises at least one additive selected from the group consisting of fluid loss additive, corrosion inhibitor, viscosifier, lost circulation material, and combinations thereof.

6. The method according to claim 1, wherein the packer fluid has a density of about 14 pounds per gallon to about 22 pounds per gallon.

7. The method according to claim 1, wherein the packer fluid has a thermal conductivity less than 1.0 BTU/h*ft*° F.

8. The method according to claim 1, wherein the fluorosurfactant is present in an amount of about 2% to about 6% by weight of the packer fluid.

9. The method according to claim 1, wherein a ratio of the fluorous oil in the external phase of the invert emulsion to the aqueous fluid in an internal phase of the invert emulsion is at least 90:10.

10. The method according to claim 1, wherein the polyol is ethylene glycol.

* * * * *